United States Patent Office 3,160,425
Patented Dec. 8, 1964

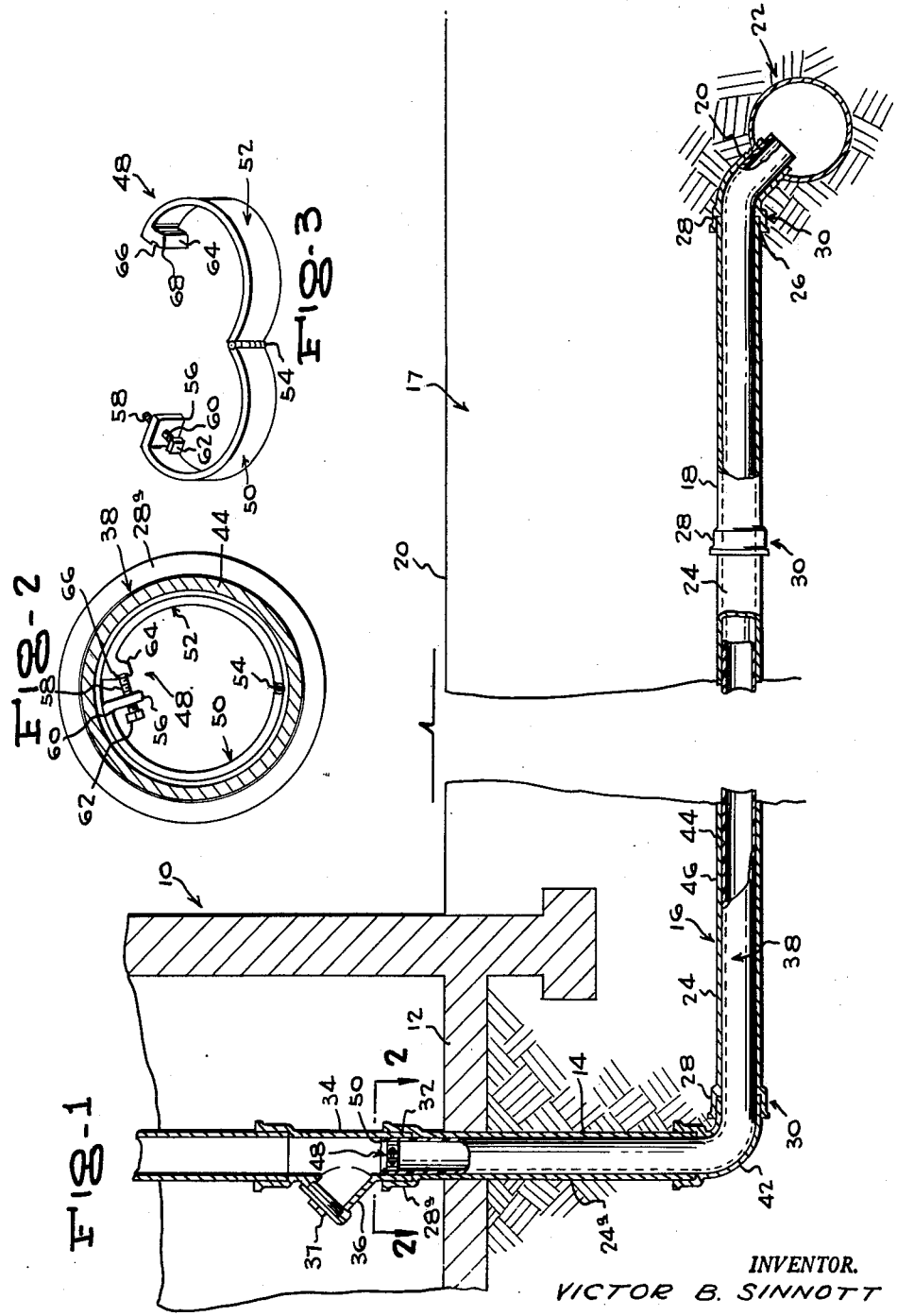

3,160,425
ANTI-ROOT SEWER PIPE LINER
Victor B. Sinnott, E. 32 Garland, Spokane 22, Wash.
Filed Dec. 22, 1960, Ser. No. 77,553
3 Claims. (Cl. 285—55)

This invention relates to a novel anti-root liner for domestic sewer pipes.

The primary object of the invention is the provision of an effective liner of the kind indicated, which is easily inserted and secured in a domestic sewer pipe or other jointed pipe, and which, when in place, seals the joints of the pipe through which tree and other roots normally gain entrance into and clog a pipe, so that frequent and expensive operations, otherwise required for clearing the pipe, are eliminated.

Another object of the invention is to provide a liner of the character indicated above, which is made of suitable noncorrosive and flexible material, such as plastic or a plastic composition, which has sufficient rigidity to assure against collapse thereof when installed in a pipe, and sufficient resilience to enable the liner to follow the bends in a pipe and to conform to the interior surfaces of the pipe.

A further object of the invention is to provide novel and efficient expanding ring means, to be inserted in the inlet end of the liner, when inserted in a pipe, and whereby the end of the liner is expanded against the interior of the pipe with sufficient force that the liner is prevented from shifting in the pipe.

Other important objects and advantageous features of the invention will be apparent from the following description, taken with the accompanying drawings, wherein, for purposes of illustration only, a specific form of the invention is set forth in detail.

In the drawings:

FIGURE 1 is a schematic and contracted vertical section showing a liner of the invention installed in a domestic sewer pipe leading into the ground away from a building to a remote sewer main;

FIGURE 2 is an enlarged horizontal section taken on the line 2—2 of FIGURE 1; and FIGURE 3 is an enlarged perspective view of the expander ring, showing the same in open position.

Referring in detail to the drawings, wherein like numerals designate like parts throughout the several views, the numeral 10 generally designates a building having a floor 12, through which an upstanding portion 14 of a domestic sewer pipe 16 extends into the ground 17, below the building, the pipe 16 having a horizontal portion 18, spaced below the surface 20 of the ground, which reaches away from the building, and opens into a sewer main 22 located at some distance from the building.

The sewer pipe 16 is formed of sections 24 having plain ends 26 inserted in expanded ends 28, forming joints 30 which are subject to leakage which attracts young roots, as of trees growing in the ground 16 near the pipe, which then enter the joints 30 and clog the interior of the pipe. As shown in FIGURE 1, a vertical section 24a forms the upstanding pipe portion 14 and an expanded upper end 28a, within the building 10 above its floor 12, into which is engaged the plain lower end 32 of an upstanding clean-out section 34, having a lateral arm 36 closed by a clean-out plug 37.

In accordance with the present invention, a tubular liner 38, of an outside diameter to fit snugly and slidably in the sewer pipe 16, and long enough to extend from the vertical or clean-out section 24a to the outlet section 40 on the outer end of the pipe 16 and entering the sewer main 22, is inserted in the pipe 16, from the upper end of the vertical section 24a, by any suitable means.

The liner 38 is made of non-corrosive impervious material, such as plastic or a plastic composition, which has sufficient flexibility and resilience to pass around bends in the pipe 16, such as the elbow section 42, and to conform snugly to the interior of the pipe 16 and seal its joints, while having sufficient rigidity to assure against collapse of the liner and conformance of the wall 44 of the liner with the wall 46 of the sewer pipe 16. With the liner positioned in the sewer pipe as above described, water and other sewage fluid cannot reach and pass through the sewer pipe joints 30 and attract roots to enter the sewer pipe through the joints.

For holding the liner 30 securely and non-shiftably in place in the sewer pipe, an expander ring 48 is provided for engagement in the upper or inlet end 50 of the liner 38. The expander ring 48 comprises first and second substantially semicircular ring sections 50 and 52 respectively, and which are piano-hinged together at one end, as indicated at 54. The ring sections are less than full semi-circle lengths, so that the other ends of the ring sections are spaced from each other when these sections are positioned to form the ring, and so that the sections can be hinged toward each other to pass into the liner. On the free end of the first ring section 50 is a radially inwardly extending ear 56, through which is threaded the shank 58 of an expanding screw 60, whose head 62 is located at the side of the ear 56 remote from the second ring section 52. On the free end of the second ring section 52 is a radially inwardly extending lug 64 having a transverse groove 66 in its screw-confronting base 68, in which the end of the screw shank 58 is adapted to engage, as shown in FIGURE 2, when the ring 48 is positioned in the liner 38 and is to be expanded. It is to be noted that the ear 56 carrying the expanding screw 60 on the free end of the first ring section 50, and the lug 64 on the free end of the second ring section 52, constitute releasable interengaging means on the free ends of the first and second ring sections 50 and 52 forcing the ring sections away from each other and against the sidewall of the liner 30.

As shown in FIGURES 1 and 2, the expander ring 48 is inserted in the upper ends of the liner 38, in the lower end of the clean-out pipe section 34, in collapsed condition, and then expanded by turning the expanding screw 60, toward the second ring section ring 64 with the end of the screw shank 58 in the groove 66, until the sidewall 44 of the upper end of the liner 38 has been forcibly expanded against and put into heavy frictional engagement with the side wall of the lower end of the clean-out section 34. The lower end 32 of the clean-out section 34 is inserted into the expanded upper end 28a of the vertical section 24a, after the liner 38 has been worked through the sewer pipe 16.

While there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a pipe composed of a plurality of sections, joints connecting said sections, and an impervious non-metallic tubular liner extending through and conformed to the interior of the pipe and extending through the joints substantially to the ends of the pipe, and means securing the liner in place at one end of the liner, said liner being flexible and resilient, said securing means comprising an expanding ring engaged in the end of the liner and forcing the sidewall of the liner against the sidewall of the pipe, said expanding ring comprising first and second arcuate flat ring sections having first ends hinged together and having second free ends, and releasable interengaging means on the second ends of said first and second ring sections forcing the ring sections away from each other and against the sidewall of the liner.

2. In combination, a pipe composed of a plurality of sections, joints connecting said sections, and an impervious non-metallic tubular liner extending through and conformed to the interior of the pipe and extending through the joints substantially to the ends of the pipe, and means securing the liner in place at one end of the liner, said liner being flexible and resilient, said securing means comprising an expanding ring engaged in the end of the liner and forcing the sidewall of the liner against the sidewall of the pipe, said expanding ring comprising first and second arcuate flat ring sections having first ends hinged together, said ring sections having second free ends, an inwardly extending ear on the free end of the first ring section, an inwardly extending lug on the free end of the second section, said lug having a face confronting said ear, said free ends being spaced from each other to provide for collapsing of the ring sections toward each other for insertion of the expander ring in the liner, and an expanding screw threaded through said ear and engaging said confronting face of the lug and forcing the ring sections away from each other and against the sidewall of the liner.

3. In combination, a pipe composed of a plurality of sections, joints connecting said sections, and an impervious non-metallic tubular liner extending through and conformed to the interior of the pipe and extending through the joints substantially to the ends of the pipe, and means securing the liner in place at one end of the liner, said liner being flexible and resilient, said securing means comprising an expanding ring engaged in the end of the liner and forcing the sidewall of the liner against the sidewall of the pipe, said expanding ring comprising first and second arcuate flat ring sections having first ends hinged together, said ring sections having second free ends, an inwardly extending ear on the free end of the first ring section, an inwardly extending lug on the free end of the second section, said lug having a face confronting said ear, said free ends being spaced from each other to provide for collapsing of the ring sections toward each other for insertion of the expander ring in the liner, and an expanding screw threaded through said ear and engaging said confronting face of the lug and forcing the ring sections away from each other and against the sidewall of the liner, said confronting face having a transverse groove in which the end of the screw is engaged.

References Cited in the file of this patent

UNITED STATES PATENTS

| | | |
|---|---|---|
| 203,094 | Wakeman | Apr. 30, 1878 |
| 582,258 | Brighton | May 11, 1897 |
| 655,688 | Coleman | Aug. 14, 1900 |
| 1,226,002 | Peeper | May 15, 1917 |
| 1,557,509 | Wentzel | Oct. 13, 1925 |
| 1,853,698 | Parker | Apr. 12, 1932 |
| 2,216,249 | Nelson | Oct. 1, 1940 |
| 2,449,731 | Therrien | Sept. 21, 1948 |
| 2,462,721 | Cohen | Feb. 22, 1949 |
| 2,580,396 | Bluth | Jan. 1, 1952 |
| 2,608,501 | Kimble | Aug. 26, 1952 |
| 2,804,559 | Brewer | Aug. 27, 1957 |
| 2,842,163 | Boylan | July 8, 1958 |
| 2,902,298 | Kolthoff | Sept. 1, 1959 |
| 2,921,606 | McCauley | Jan. 19, 1960 |
| 3,015,500 | Barnett | Jan. 2, 1962 |

FOREIGN PATENTS

| | | |
|---|---|---|
| 615,737 | France | Oct. 18, 1926 |
| 22,293 | Great Britain | Nov. 21, 1893 |